United States Patent
Asaoka et al.

(10) Patent No.: US 9,662,948 B2
(45) Date of Patent: May 30, 2017

(54) KNUCKLE BRACKET AND PAIR OF KNUCKLE BRACKETS

(71) Applicant: KAYABA INDUSTRY CO., LTD., Tokyo (JP)

(72) Inventors: Shotaro Asaoka, Gifu (JP); Kazuhiro Setoguchi, Gifu (JP); Yuta Hoshino, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/767,604

(22) PCT Filed: Mar. 25, 2014

(86) PCT No.: PCT/JP2014/058356
§ 371 (c)(1),
(2) Date: Aug. 13, 2015

(87) PCT Pub. No.: WO2014/157246
PCT Pub. Date: Oct. 2, 2014

(65) Prior Publication Data
US 2015/0375587 A1     Dec. 31, 2015

(30) Foreign Application Priority Data

Mar. 26, 2013 (JP) ................................. 2013-063928

(51) Int. Cl.
*F16M 13/00* (2006.01)
*B60G 3/06* (2006.01)
(Continued)

(52) U.S. Cl.
CPC .............. *B60G 3/06* (2013.01); *B60G 13/005* (2013.01); *B60G 13/008* (2013.01);
(Continued)

(58) Field of Classification Search
USPC ........................................................ 248/542
See application file for complete search history.

(56) References Cited

U.S. PATENT DOCUMENTS 4,491,339 A * 1/1985 Mizumukai .......... B60G 13/006
                                              188/321.11
4,736,964 A    4/1988 Specktor
(Continued)

FOREIGN PATENT DOCUMENTS

JP     2006-233986 A     9/2006
JP     2007-045282 A     2/2007
(Continued)

*Primary Examiner* — Monica Millner
(74) *Attorney, Agent, or Firm* — Rabin & Berdo, P.C.

(57) ABSTRACT

A knuckle bracket includes a cylindrical bracket main body that is fixed by welding to an outer periphery of an outer tube of a shock absorber and a pair of gripping pieces that extend along an axial direction of the bracket main body and stand up toward the outside from the bracket main body opposing each other. The bracket main body has a cut-away part formed on one side end and a compression part, the compression part being configured to abut a misassembly detection pin of a misassembly prevention device, the misassembly prevention device being configured to identify a type of the knuckle bracket.

8 Claims, 7 Drawing Sheets

(51) Int. Cl.
*F16F 9/54* (2006.01)
*F16F 9/32* (2006.01)
*B60G 13/00* (2006.01)

(52) U.S. Cl.
CPC .............. *F16F 9/3242* (2013.01); *F16F 9/54* (2013.01); *B60G 2200/142* (2013.01); *B60G 2204/43* (2013.01); *B60G 2204/4304* (2013.01)

(56) References Cited

U.S. PATENT DOCUMENTS

| | | | | |
|---|---|---|---|---|
| 4,948,160 | A * | 8/1990 | Barry | B60G 13/006 280/86.753 |
| 4,971,352 | A * | 11/1990 | Jordan | B60G 13/006 280/86.754 |
| 5,129,669 | A * | 7/1992 | Specktor | B60G 11/28 280/86.753 |
| 5,170,973 | A * | 12/1992 | Ohta | B60G 13/006 248/230.2 |
| 5,730,547 | A * | 3/1998 | Nogami | B60G 13/006 248/230.1 |
| 6,367,751 | B1 * | 4/2002 | Perrott | B60G 13/005 248/218.4 |
| 7,022,932 | B2 * | 4/2006 | Hatakeyama | B21D 17/02 219/61 |
| 7,163,215 | B2 * | 1/2007 | Mathis | B65H 75/40 280/86.751 |
| 7,628,415 | B2 * | 12/2009 | Kitamura | B60G 3/06 280/124.145 |
| 7,793,971 | B2 * | 9/2010 | Sakashita | B60G 13/005 188/321.11 |
| 8,047,342 | B2 * | 11/2011 | Nagasawa | F16F 9/54 188/321.11 |
| 8,800,734 | B2 * | 8/2014 | Handke | F16F 9/54 188/322.12 |
| 2002/0141817 | A1 * | 10/2002 | Handke | B60G 15/07 403/384 |
| 2007/0231066 | A1 | 10/2007 | Kitamura et al. | |
| 2007/0278726 | A1 | 12/2007 | Nagasawa et al. | |
| 2008/0066289 | A1 * | 3/2008 | Gokan | B21D 28/32 29/505 |

FOREIGN PATENT DOCUMENTS

| | | |
|---|---|---|
| JP | 2007-263349 A | 10/2007 |
| JP | 2007-320332 A | 12/2007 |
| JP | 2011-168199 A | 9/2011 |

* cited by examiner

KNUCKLE BRACKET AND PAIR OF KNUCKLE BRACKETS

TECHNICAL FIELD

The present invention relates to a knuckle bracket and a pair of knuckle brackets.

BACKGROUND ART

JP2007-45282A and JP2007-320332A disclose a knuckle bracket including a cylindrical bracket main body that is fixed by welding to an outer periphery of an outer tube of a shock absorber, and a pair of gripping pieces that extend along an axial direction of the bracket main body and stand up toward the outside from the bracket main body opposing each other. The knuckle bracket is used in a strut-type suspension. The strut-type suspension is connected to a knuckle that retains a vehicle wheel so that it can rotate via the gripping pieces of the knuckle bracket.

SUMMARY OF INVENTION

Normally, a shock absorber of a strut-type suspension is differentiated into a right-side shock absorber disposed on the right side of the vehicle and a left-side shock absorber disposed on the left side of the vehicle, and the right-side shock absorber and the left-side shock absorber form a pair. However, a knuckle bracket that is attached to a shock absorber can be attached to both the right-side shock absorber and the left-side shock absorber. Some knuckle brackets do not need to be differentiated into a right-side knuckle bracket and a left-side knuckle bracket. However, for example, there are some knuckle brackets which must be differentiated into a right-side and a left-side, such that the shape of the right-side knuckle bracket to be attached to the right-side shock absorber is different from the shape of the left-side knuckle bracket to be attached to the left-side shock absorber. In particular, if the difference between the knuckle brackets is minute, it is necessary to take measures to prevent assembly mistakes so that the left-side knuckle bracket is not accidentally attached to the right-side shock absorber or the right-side knuckle bracket is not accidentally attached to the left-side shock absorber.

Figure 5:
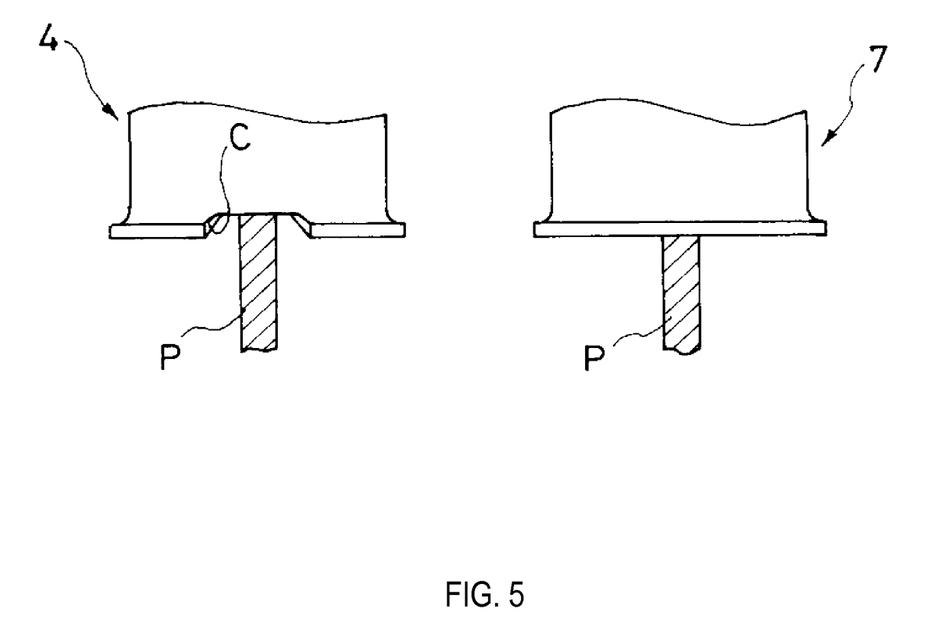
FIG. 5 partially illustrates a conventional pair of knuckle brackets when viewed from the opposite side of the gripping pieces.

As such a measure to prevent assembly mistakes, it is effective to put marks on the knuckle brackets so that they can be identified visually. Further, the identification accuracy can be improved by using a device for preventing assembly mistakes that identifies the type of knuckle bracket so that the knuckle brackets can be mechanically identified. For example, in the case of mechanical identification, as shown in FIG. 5, there is a method in which a cut-away part C is provided on either one of the left and right knuckle brackets 4 and 7, and a misassembly detection pin P of the device for preventing assembly mistakes is abutted to the portion at which the cut-away part C is provided. In this case, the misassembly detection pin P that is abutted to the knuckle bracket 4 which includes the cut-away part C is inserted by an amount equivalent to the portion at which the cut-away part C is formed compared to the misassembly detection pin P that is abutted to the other knuckle bracket 7 which does not include the cut-away part C. If the difference in the amount of insertion of the misassembly detection pins P is configured so that it can be detected by a sensor or the like, the right-side and the left-side can be mechanically identified. If it is confirmed to be the correct type, the knuckle bracket 4 or 7 is welded to the outer tube of the shock absorber. The gripping pieces of the knuckle brackets 4 and 7 warp due to this welding, and thus the width dimension between the two surfaces of the gripping pieces is corrected to a predetermined dimension by a jig.

This method for mechanical identification is effective in that the type of the knuckle brackets 4 and 7 can be reliably identified. However, differences may occur in how the gripping pieces warp depending on the presence or absence of the cut-away part C. Therefore, it is necessary to prepare different jigs for the right-side knuckle bracket and the left-side knuckle bracket, and the required labor increases because the jigs must be exchanged.

An object of the present invention is to provide a knuckle bracket and a pair of knuckle brackets that enable a knuckle bracket provided with a cut-away part for inserting a misassembly detection pin to be identified by using a misassembly prevention device, and enable the gripping pieces to be corrected using a common jig.

According to one aspect of the present invention, a knuckle bracket includes a cylindrical bracket main body that is fixed by welding to an outer periphery of an outer tube of a shock absorber and a pair of gripping pieces that extend along an axial direction of the bracket main body and stand up toward the outside from the bracket main body opposing each other. The bracket main body has a cut-away part formed on one side end and a compression part, the compression part being configured to abut a misassembly detection pin of a misassembly prevention device, the misassembly prevention device being configured to identify a type of the knuckle bracket.

DESCRIPTION OF EMBODIMENTS

A knuckle bracket according to an embodiment of the present invention will now be explained below referring to the drawings.

Figure 1A:
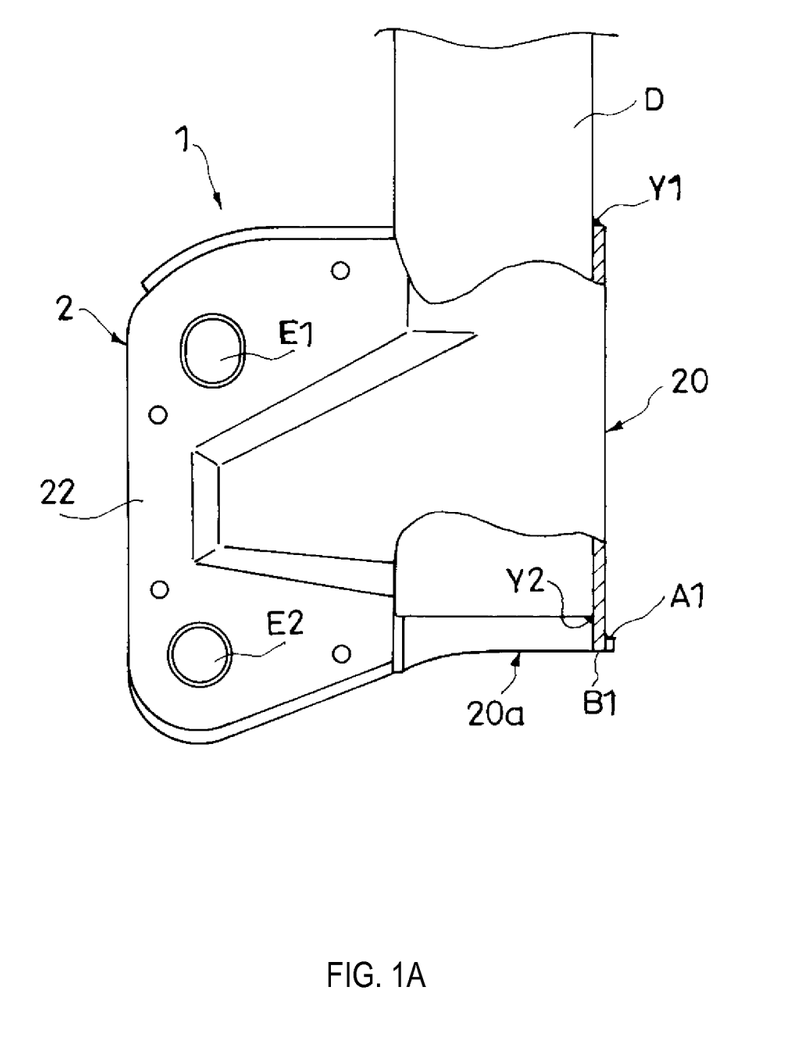
FIG. 1A is a partially cut-away front view of a knuckle bracket according to an embodiment of the present invention in a state in which the knuckle bracket is attached to an outer tube of a shock absorber.
Figure 1B:
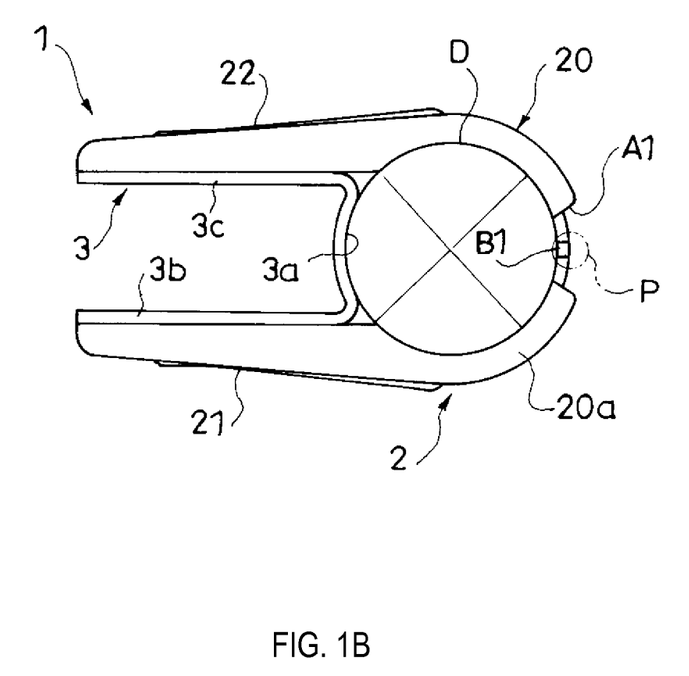
FIG. 1B is a bottom view of FIG. 1A.

As shown in FIGS. 1A and 1B, a knuckle bracket 1 includes a cylindrical bracket main body 20 that is fixed by welding to an outer periphery of an outer tube D of a shock absorber, a pair of gripping pieces 21 and 22 that extend along an axial direction of the bracket main body 20 and stand up toward the outside from the bracket main body 20 opposing each other. Further, the bracket main body 20 has a cut-away part A1 formed on a lower end (one side end) 20a, and a compression part B1 that is abutted by a misassembly detection pin P of a misassembly prevention device that identifies the type of the knuckle bracket 1.

The knuckle bracket 1 is used in a strut-type suspension that utilizes a shock absorber as a support column for positioning the wheel of an automobile, and is attached to the outer periphery of the outer tube D of the shock absorber. The shock absorber can have any kind of structure as long as it includes the outer tube D that is connected to a vehicle wheel side via the knuckle bracket 1. For example, the shock absorber can be configured to include the outer tube D and a piston rod that is connected to the vehicle body side via a vehicle body-side mount and goes into and out of the outer tube D, such that the shock absorber can exert a damping force that suppresses relative movement in the axial direction of the outer tube D and the piston rod. There is a right-side shock absorber disposed on the right side of the vehicle and a left-side shock absorber disposed on the left side of the vehicle, and the right-side shock absorber and the left-side shock absorber form a pair.

The knuckle bracket 1 shown in FIGS. 1A and 1B is a right-side knuckle bracket 1 that is attached to the right-side shock absorber, and it forms a pair with a left-side knuckle bracket 4 (refer to FIGS. 2A and 2B) that is attached to the left-side shock absorber. The basic structure of the pair of knuckle brackets 1 and 4 is the same, and is a two-panel structure having an outer bracket 2, 5 and an inner bracket 3, 6. The outer bracket 2, 5 of each knuckle bracket 1, 4 has a cylindrical bracket main body 20, 50 that is curved in a circular arc shape and embraces the outer periphery of the outer tube D, and a pair of gripping pieces 21, 22, 51, 52 that extend along an axial direction at both side surface ends of the bracket main body 20, 50 and stand up toward the outside from the bracket main body 20, 50 opposing each other. The inner bracket 3, 6 of each knuckle bracket 1, 4 is formed to have a U-shaped cross-section, and a back surface 3a, 6a of the inner bracket 3, 6 is oriented toward the outer tube D and both side surfaces 3b, 3c, 6b, 6c follow along the inside of both gripping pieces 21, 22, 51, 52. The knuckle bracket 1, 4 of the present embodiment has a two-panel structure consisting of the outer bracket 2, 5, and the inner bracket 3, 6, which are formed by die-cutting a panel-shaped base material and then bending it. However, the knuckle bracket 1, 4 can have a single panel structure, and the method of forming the knuckle bracket 1, 4 is not limited to that mentioned above.

In each gripping piece 21, 22, 51, and 52 of both knuckle brackets 1 and 4, two bolt insertion holes E1 and E2 are formed at the top and bottom (the bolt insertion holes of one gripping piece 21, 51 are not illustrated). The knuckle brackets 1 and 4 are each connected to a knuckle that retains a vehicle wheel so that it can rotate by bolts inserted in the bolt insertion holes E1 and E2 and nuts. The shape of the top-side bolt insertion hole E1 formed on the one gripping piece 21, 51, of each knuckle bracket 1, 4 (the top-side bolt formed on the one gripping piece 21, 51 is not illustrated) is different from the shape of the top-side bolt insertion hole E1 formed in the other gripping piece 22, 52. Therefore, when the right-side shock absorber and the left-side shock absorber are attached to the vehicle, they are disposed in left-right symmetry centered on a center line of the vehicle.

For this reason, it is necessary to differentiate the right-side knuckle bracket 1 that is attached to the right-side shock absorber and the left-side knuckle bracket 4 that is attached to the left-side shock absorber. However, the reason for this differentiation is not limited to that mentioned above, and the knuckle brackets can be differentiated into a right-side and a left-side for other reasons.

Figure 2A:
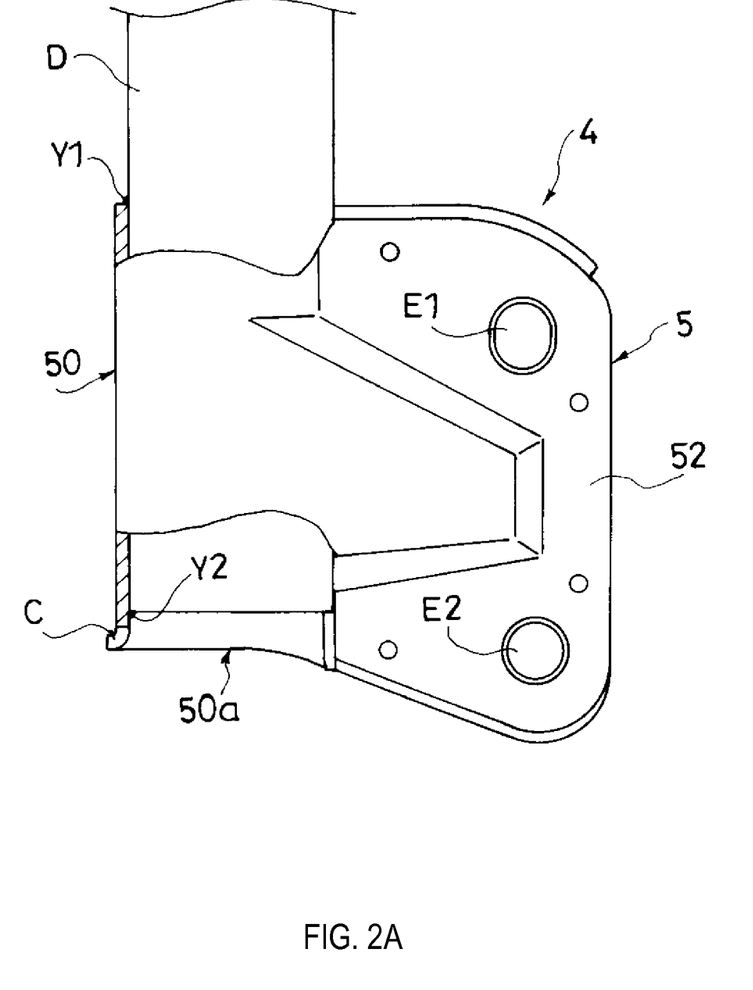
FIG. 2A is a partially cut-away front view of a knuckle bracket that forms a pair with the knuckle bracket according to the embodiment of the present invention in a state in which the knuckle bracket is attached to an outer tube of a shock absorber.

The bracket main body 20, 50 of both knuckle brackets 1 and 4 embraces the lower end in FIGS. 1A and 2A, which is the end on the vehicle wheel side, of the outer tube D and is fixed by welding to the outer tube D. After the outer tube D is press fitted inside each bracket main body 20 and 50 but before welding, the misassembly prevention device is used to confirm that the right-side knuckle bracket 1 is attached to the right-side shock absorber and the left-side knuckle bracket 4 is attached to the left-side shock absorber. Subsequently, the top end edge of the bracket main body 20, 50 and the outer periphery of the outer tube D are welded along the peripheral direction (a welding part Y1 in FIGS. 1A and 2A), and the bottom end edge of the outer tube D and the inner periphery of the bracket main body 20, 50 are welded along the peripheral direction (a welding part Y2 in FIGS. 1A and 2A). The lower end 20a, 50a of the bracket main body 20, 50 of both knuckle brackets 1 and 4 protrudes downward from the outer tube D and projects in a curve toward the outside so as to form a flange shape.

As shown in FIGS. 1A and 1B, the cut-away part A1 is formed in a portion of the flange-shaped lower end 20a of the right-side knuckle bracket 1, and the compression part B1 that extends along the axial direction of the bracket main body 20 is formed in the center of the cut-away part A1. Therefore, the misassembly detection pin P of the misassembly prevention device runs into the compression part B1 and is not inserted into the cut-away part A1. The cut-away part A1 is formed on the opposite side of the gripping pieces 21 and 22, and the distances from the cut-away part A1 to each gripping piece 21 and 22 are approximately the same. Thus, when the bracket main body 20 has been welded to the outer tube D, the warping of the pair of gripping pieces 21 and 22 is similar.

Figure 2B:
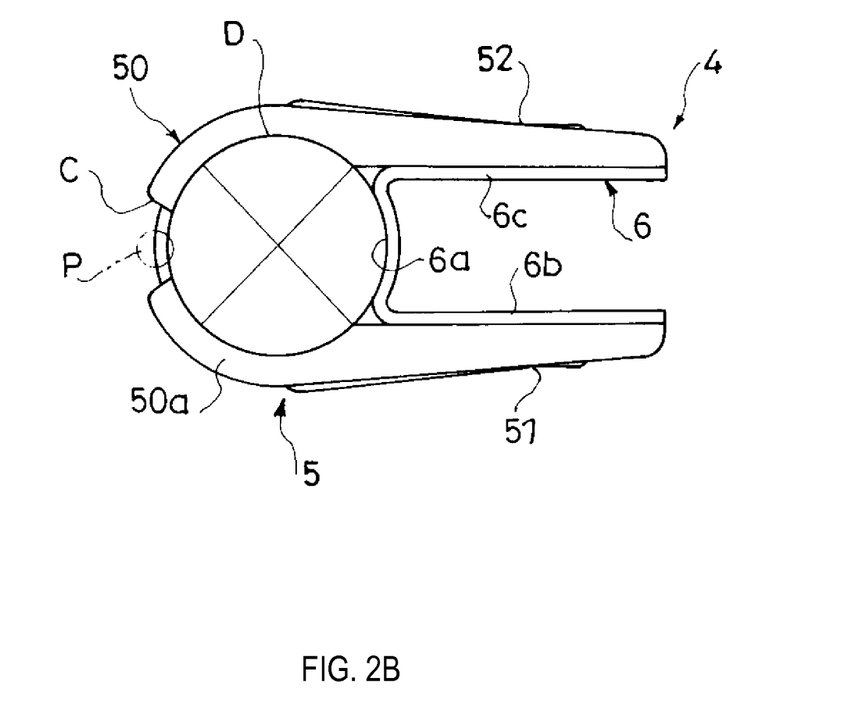
FIG. 2B is a bottom view of FIG. 2A.

As shown in FIGS. 2A and 2B, only a cut-away part C is formed in a portion of the flange-shaped lower end 50a of the left-side knuckle bracket 4. Therefore, the misassembly detection pin P of the misassembly prevention device is inserted into the cut-away part C. The cut-away part C is formed at the same position as the cut-away part A1 of the right-side knuckle bracket 1. Thus, when the bracket main bodies 20 and 50 have been welded to the outer tubes D, the warping of the gripping piece pairs 21, 22 and 51, 52 of the right-side and left-side knuckle brackets 1 and 4 is similar. Further, similar to the right-side, the cut-away part C is formed on the opposite side of the gripping pieces 51 and 52 in the left-side knuckle bracket 4 as well, and the distances from the cut-away part C to each gripping piece 51 and 52 are approximately the same. Thus, when the bracket main body 50 has been welded to the outer tube D, the warping of the pair of gripping pieces 51 and 52 is similar.

Next, the misassembly prevention device will be explained. The misassembly prevention device includes a retention tool that retains the knuckle bracket 1, 4 before welding in a state in which the outer tube D has been press fitted into the inside of the knuckle bracket 1, 4, an misassembly detection pin P that opposes the side opposite to the gripping pieces of the lower end 20a, 50a of the bracket main body 20, 50, a support tool that slidably supports the misassembly detection pin P, and a sensor that detects the sliding amount of the misassembly detection pin P. The misassembly prevention device can mechanically identify whether the knuckle bracket 1, 4 is for the right side or the left side. The misassembly prevention device is also differentiated into a right-side identification device that identifies whether a knuckle bracket is the right-side knuckle bracket 1, and a left-side identification device that identifies whether a knuckle bracket is the left-side knuckle bracket 4.

Figure 3:
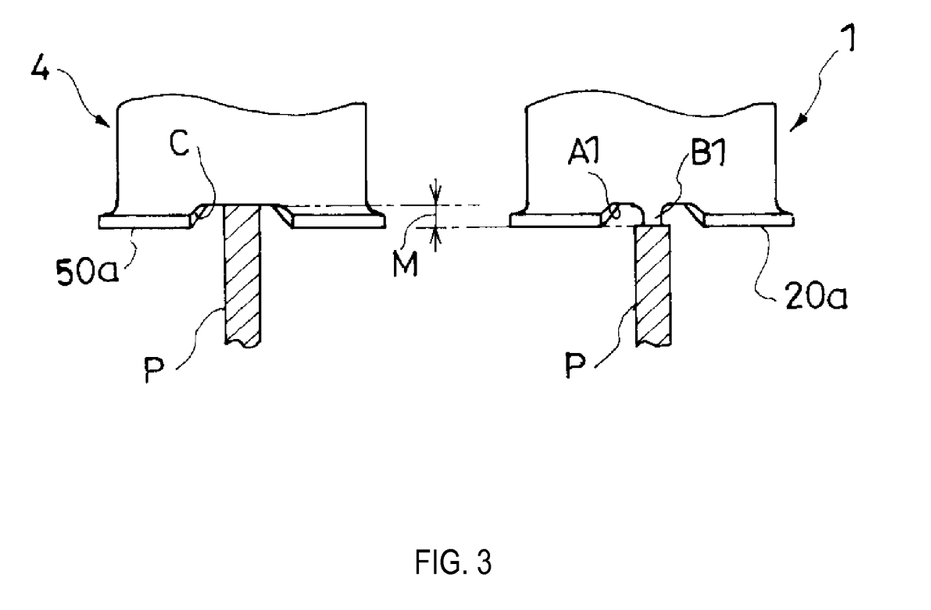
FIG. 3 partially illustrates the knuckle bracket shown in FIG. 1 and the knuckle bracket shown in FIG. 2 when viewed from the opposite side of the gripping pieces.

In the right-side misassembly prevention device, if the left-side knuckle bracket 4 is mistakenly attached to the retention tool, when the retention tool and the support tool are brought close to each other, the misassembly detection pin P will not be pushed back as expected by an amount equivalent to the amount by which the misassembly detection pin P is inserted into the cut-away part C (M in FIG. 3) as shown in the left side of FIG. 3. Therefore, the sliding amount of the misassembly detection pin P decreases. This abnormality is detected by the sensor, and thereby an assembly mistake can be detected. In the left-side misassembly prevention device, if the right-side knuckle bracket 1 is mistakenly attached to the retention tool, when the retention tool and the support tool are brought close to each other, the misassembly detection pin P will not be inserted into the cut-away part A1 and will run into the compression part B1 as shown in the right side of FIG. 3. Thus, the misassembly detection pin P is pushed back more than expected by an amount equivalent to the axial length of the compression part B1 (M in FIG. 3). Therefore, the sliding amount of the misassembly detection pin P increases. This abnormality is detected by the sensor, and thereby an assembly mistake can be detected.

According to the above method, the type of the knuckle bracket 1, 4 alone can be identified before the outer tube D is press fitted into the inside of the knuckle bracket 1, 4. However, after differentiating the type, the knuckle bracket 1, 4 may become mixed in with the other type before the knuckle bracket 1, 4 is attached to the outer tube D of the shock absorber. Therefore, assembly mistakes can be more reliably prevented by confirming the type of the knuckle bracket 1, 4 in a state in which the outer tube D has been press fitted into the inside of the knuckle bracket 1, 4. The structure of the misassembly prevention device and the method of identification are not limited to those described above, and any structure and method are acceptable as long as the type of knuckle bracket 1, 4 can be mechanically identified using the misassembly detection pin P.

Next, the operational effects of the knuckle bracket according to the present embodiment will be explained below.

In the present embodiment, the cut-away parts C and A1 are formed in both of the knuckle brackets 1 and 4 which form a pair. Therefore, when the bracket main body 20, 50 of each knuckle bracket 1, 4 is welded to the outer tube D, any differences in the warping of the gripping pieces 21 and 22 of the one knuckle bracket 1 and the gripping pieces 51 and 52 of the other knuckle bracket 4 can be reduced. Thus, the gripping pieces 21, 22, 51, and 52 that have warped due to welding can be corrected using a common jig for both of the knuckle brackets 1 and 4. In addition, since the same jig is used, the labor required to exchange the jig or the like can be eliminated.

If the cut-away part formed for the purpose of identification is provided to only one of the knuckle brackets, large differences in the warping of the gripping pieces after welding may occur between the knuckle bracket with the cut-away part and the knuckle bracket without the cut-away part, and thus the gripping pieces cannot be corrected using the same jig. Accordingly, if the cut-away part C for inserting the misassembly detection pin is provided to only one among the pair of knuckle brackets 1 and 4, it is effective to provide the cut-away part A1 and the compression part B1 to the other knuckle bracket.

The knuckle bracket 1 according to the present embodiment does not necessarily have to constitute only one among the pair of knuckle brackets, and can be attached to both of the pair of shock absorbers. In this case, by changing the height of the compression part between the left and right knuckle brackets, the left and right knuckle brackets can be identified according to the difference in the sliding amount of the misassembly detection pin P. Further, in order to identify knuckle brackets to be attached to many types of shock absorbers, the height of the compression part provided to each knuckle bracket can be changed. In this case as well, the knuckle brackets can be identified according to the difference in the sliding amount of the misassembly detection pin P, and the gripping pieces can be corrected using the same jig. Also, in the present embodiment, the knuckle bracket 1 in which the cut-away part A1 and the compression part B1 are formed is for the right side, and the knuckle bracket 4 in which the cut-away part C is formed is for the left side, but the opposite is also possible.

The compression part B1 of the right-side knuckle bracket 1 according to the present embodiment is disposed along the axial direction of the bracket main body 20 in the center of the cut-away part A1. Therefore, the width of the cut-away part A1 can be made the same as the width of the cut-away part C for inserting the misassembly detection pin of the left-side knuckle bracket 4, and the cut-away part A1 can be formed at the same position as the cut-away part C. As a result, when welding the bracket main bodies 20 and 50 of the knuckle brackets 1 and 4 to the outer tubes D, the warping of the gripping pieces 21, 22, 51, and 52 in both knuckle brackets 1 and 4 is similar.

In the present embodiment, the compression part B1 formed in the right-side knuckle bracket 1 extends straight out along the axial direction of the bracket main body 20. Therefore, the cut-away part A1 and the compression part B1 can be formed simultaneously when removing the die of the outer bracket 2 from the panel-shaped base material, and thus the right-side knuckle bracket 1 is easy to manufacture.

The lower end 20a of the bracket main body 20 of the right-side knuckle bracket 1 according to the present embodiment protrudes toward the vehicle wheel side from the outer tube D and projects toward the outer periphery so as to form a flange shape. Therefore, even in the state in which the outer tube D has been press fitted into the inside of the right-side knuckle bracket 1, the misassembly detection pin P can easily abut the compression part B1-B4 without contacting the outer tube D. Further, in the left-side knuckle bracket 4, by similarly forming the lower end 50a of the bracket main body 50, the misassembly detection pin P can be easily inserted into the cut-away part C without contacting the outer tube D. The position at which the misassembly detection pin P is abutted can be appropriately modified. For example, the bracket main body 20, 50 can also be configured such that the misassembly detection pin P is abutted to the top end of the bracket main body 20, 50.

The cut-away part A1-A4 of the right-side knuckle bracket 1 according to the present embodiment is formed on the opposite side of the gripping pieces of the bracket main body 20. Therefore, the distances from the cut-away part A1-A4 to each gripping piece 21 and 22 are approximately the same, and thus when the bracket main body 20 has been welded to the outer tube D, the warping of the pair of gripping pieces 21 and 22 can be similar. The position at which the cut-away part A1-A4 is provided is not limited to the above-described position, and can be appropriately modified.

Next, alternative embodiments of the compression part formed in the knuckle bracket 1 will be explained below.

Figure 4A:
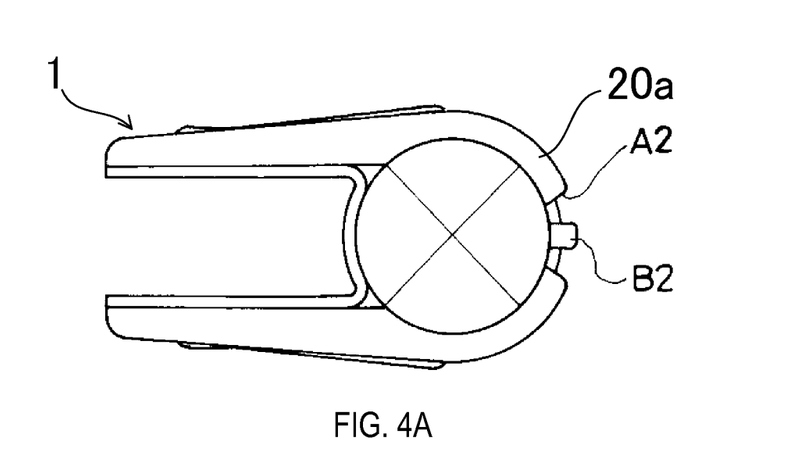
FIG. 4A illustrates a first alternative embodiment of a cut-away part and a compression part of the knuckle bracket according to the embodiment of the present invention.

As shown in a first alternative embodiment in FIG. 4A, a cut-away part A2 and a compression part B2 can be formed by partially cutting away the lower end 20a of the bracket main body 20 which has a flange shape. Also, as shown in a second alternative embodiment in FIG. 4B, a compression part B3 can be formed on one side of a cut-away part A3. Further, as shown in a third alternative embodiment in FIG. 4C, compression parts B4 and B4 can be formed on both sides of a cut-away part A4.

Figure 4B:
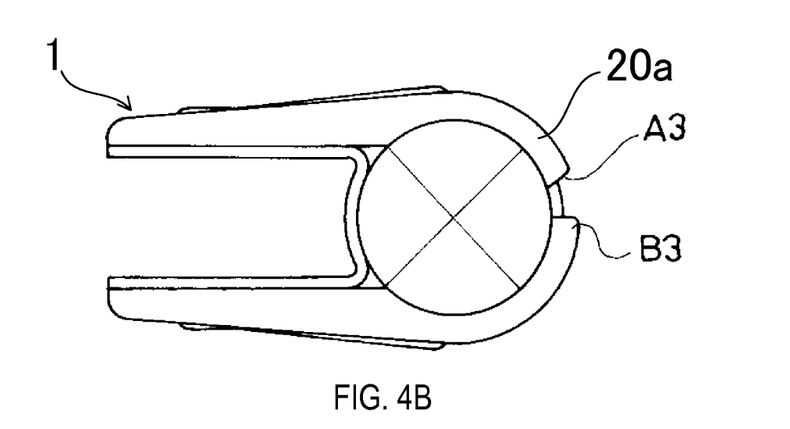
FIG. 4B illustrates a second alternative embodiment of a cut-away part and a compression part of the knuckle bracket according to the embodiment of the present invention.
Figure 4C:
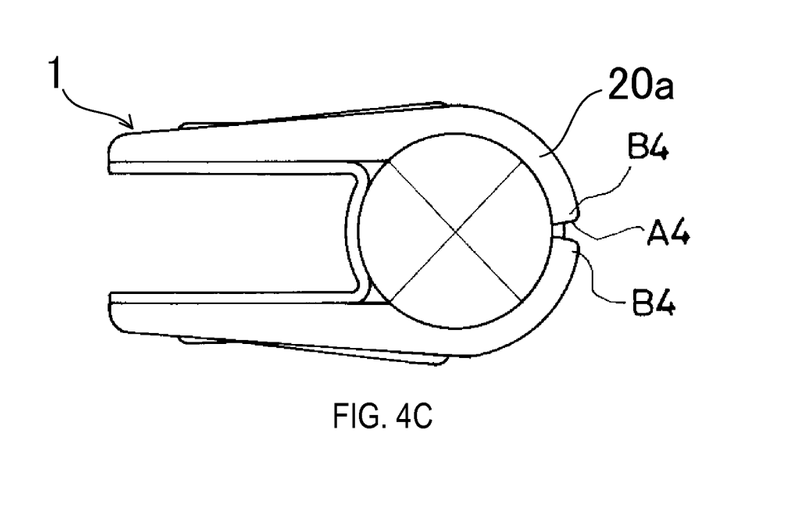
FIG. 4C illustrates a third alternative embodiment of a cut-away part and a compression part of the knuckle bracket according to the embodiment of the present invention.

In the second and third alternative embodiments, similar to the present embodiment, the cut-away parts A3 and A4 and the compression parts B3 and B4 can be formed simultaneously when removing the die of the outer bracket 2 from the panel-shaped base material, and thus the knuckle bracket 1 is easy to manufacture.

The compression parts B1 to B4 are formed so as to completely block the insertion of the misassembly detection pin P into the cut-away parts A1 to A4. However, the compression parts B1 to B4 may permit a certain amount of insertion of the misassembly detection pin P into the cut-away parts A1 to A4. In other words, providing the compression parts B1 to B4 should change the behavior of the misassembly detection pin P compared to the case in which the misassembly detection pin P is inserted into the cut-away part C for inserting the misassembly detection pin.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2013-063928 filed with the Japan Patent Office on Mar. 26, 2013, the entire contents of which are incorporated into this specification.

The invention claimed is:

1. A knuckle bracket comprising:
    a cylindrical bracket main body that is fixed by welding to an outer periphery of an outer tube of a shock absorber; and
    a pair of gripping pieces that extend along an axial direction of the bracket main body and stand up toward the outside from the bracket main body to oppose each other,
    wherein the bracket main body has a cut-away part formed on one side end and a compression part configured to abut a misassembly detection pin of a misassembly prevention device, the misassembly prevention device being configured to identify a type of the knuckle bracket, and
    further wherein the compression part is disposed along an axial direction of the bracket main body in a center of the cut-away part.

2. A pair of knuckle brackets consisting of a first knuckle bracket that is attached to one shock absorber and a second knuckle bracket that is attached to another shock absorber,
    wherein each of the first and second knuckle brackets comprises:
        a cylindrical bracket main body that is fixed by welding to an outer periphery of an outer tube of a corresponding shock absorber of the one and another shock absorbers; and
        a pair of gripping pieces that extend along an axial direction of the bracket main body and stand up toward the outside from the bracket main body to oppose each other,
    wherein the bracket main body of the first knuckle bracket has a cut-away part formed on one side end, the cut-away part being configured such that a misassembly detection pin of a misassembly prevention device is insertable into the cut-away part, the misassembly prevention device is configured to identify types of the first and second knuckle brackets, and
    the bracket main body of the second knuckle bracket has, in a position corresponding to the cut-away part, a compression part and another cut-away part provided adjacent to the compression part, wherein the compression part is configured to abut the misassembly detection pin to prevent the misassembly detection pin from being inserted.

3. The pair of knuckle brackets according to claim 2, wherein the cut-away part of the bracket main body of the first knuckle bracket is disposed on an opposite side of the outer tube of the corresponding shock absorber relative to the gripping pieces of the first knuckle bracket.

4. The pair of knuckle brackets according to claim 2, wherein
    each of the first and second knuckle brackets is adapted to connect a shock absorber to a knuckle that retains a vehicle wheel,
    the one side end of the bracket main body the first knuckle bracket protrudes toward a vehicle wheel side from the outer tube of the corresponding shock absorber and projects toward an outer periphery so as to form a flange shape, and
    a one side end of the bracket main body the second knuckle bracket protrudes toward a vehicle wheel side from the outer tube of the corresponding shock absorber and projects toward an outer periphery so as to form a flange shape.

5. The pair of knuckle brackets according to claim 2, wherein the another cut-away part is formed on one side or on both sides of the compression part of the bracket main body of the second knuckle bracket.

6. The pair of knuckle brackets according to claim 2, wherein the compression part is disposed in a part along an axial direction of the bracket main body of the second knuckle bracket corresponding to a center of the cut-away part of the bracket main body of the first knuckle bracket.

7. The knuckle bracket according to claim 1, wherein the cut-away part is disposed in the bracket main body on an opposite side of the outer tube to the gripping pieces.

8. A knuckle bracket comprising:
    a cylindrical bracket main body that is fixed by welding to an outer periphery of an outer tube of a shock absorber; and
    a pair of gripping pieces that extend along an axial direction of the bracket main body and stand up toward the outside from the bracket main body to oppose each other,
    wherein the bracket main body has a cut-away part formed on one side end and a compression part configured to abut a misassembly detection pin of a misassembly prevention device, the misassembly prevention device being configured to identify a type of the knuckle bracket, and
    further wherein the compression part is disposed along an axial direction of the bracket main body to cause the cut-away part to be located on both sides of the compression part in a peripheral direction.

* * * * *